(12) United States Patent
Bao et al.

(10) Patent No.: US 9,391,760 B2
(45) Date of Patent: Jul. 12, 2016

(54) METHOD AND DEVICE FOR ACCESSING WIRELESS NETWORK

(75) Inventors: Dongshan Bao, Beijing (CN); Huijuan Yao, Beijing (CN); Yubao Zhou, Beijing (CN); Xiaoyan Yu, Beijing (CN); Jun Lei, Beijing (CN); Shenfa Liu, Beijing (CN); Jing Wang, Beijing (CN); Lijun Pan, Beijing (CN); Zhigang Yan, Beijing (CN)

(73) Assignee: BEIJING NUFRONT MOBILE MULTIMEDIA TECHNOLOGY CO., LTD, Beijing (CN)

( * ) Notice: Subject to any disclaimer, the term of this patent is extended or adjusted under 35 U.S.C. 154(b) by 106 days.

(21) Appl. No.: 14/008,958

(22) PCT Filed: Mar. 7, 2012

(86) PCT No.: PCT/CN2012/072054
§ 371 (c)(1),
(2), (4) Date: Sep. 30, 2013

(87) PCT Pub. No.: WO2012/130027
PCT Pub. Date: Oct. 4, 2012

(65) Prior Publication Data
US 2014/0086169 A1 Mar. 27, 2014

(30) Foreign Application Priority Data

| Mar. 31, 2011 | (CN) | 2011 1 0081193 |
| Mar. 31, 2011 | (CN) | 2011 1 0081288 |
| May 19, 2011 | (CN) | 2011 1 0130194 |
| Jul. 6, 2011 | (CN) | 2011 1 0189226 |
| Feb. 16, 2012 | (CN) | 2012 1 0035791 |
| Feb. 29, 2012 | (CN) | 2012 1 0050554 |

(51) Int. Cl.
*H04W 4/00* (2009.01)
*H04L 5/00* (2006.01)
(Continued)

(52) U.S. Cl.
CPC ............. *H04L 5/0094* (2013.01); *H04W 48/12* (2013.01); *H04W 56/00* (2013.01); *H04W 74/00* (2013.01); *H04W 28/18* (2013.01); *H04W 72/04* (2013.01)

(58) Field of Classification Search
USPC ................. 370/225–252, 319–329, 336–350; 455/423–456
See application file for complete search history.

(56) References Cited

U.S. PATENT DOCUMENTS

| 7,885,604 B2 * | 2/2011 | Wee et al. | 455/63.1 |
| 7,978,732 B2 * | 7/2011 | Kim et al. | 370/470 |

(Continued)

FOREIGN PATENT DOCUMENTS

| CN | 101 578 824 | 11/2009 |
| CN | 101 594 284 | 12/2009 |

(Continued)

*Primary Examiner* — Man Phan
(74) *Attorney, Agent, or Firm* — Anova Law Group, PLLC (57) ABSTRACT

The present invention provides a method for accessing a wireless network, so as to implement acquisition of system synchronization during the process of accessing the wireless network in the situation that a physical frame structure can be configured dynamically. The method for acquiring system synchronization comprises: searching a physical frame on a current sub-channel; resolving a system information channel (SICH) and a control channel (CCH) in the found physical frame, wherein the SICH indicates a structure of the physical frame, and the CCH indicates allocation of system resources; and acquiring a system parameter from the physical frame by using the resolving result. A device for implementing the above method is further provided.

12 Claims, 7 Drawing Sheets

(51) Int. Cl.
*H04W 74/00* (2009.01)
*H04W 56/00* (2009.01)
*H04W 48/12* (2009.01)
*H04W 28/18* (2009.01)
*H04W 72/04* (2009.01)

(56) References Cited

U.S. PATENT DOCUMENTS

| | | | |
|---|---|---|---|
| 8,089,911 B2 * | 1/2012 | Huang et al. | 370/312 |
| 8,326,324 B2 * | 12/2012 | Wu et al. | 455/456.2 |
| 8,374,115 B2 * | 2/2013 | Huang et al. | 370/312 |
| 8,446,869 B2 * | 5/2013 | Lee et al. | 370/329 |
| 8,982,750 B2 * | 3/2015 | Palanki et al. | 370/310 |
| 2008/0075032 A1 * | 3/2008 | Balachandran et al. | 370/317 |
| 2008/0130538 A1 | 6/2008 | Raissinia et al. | |
| 2009/0141670 A1 | 6/2009 | Ho | |
| 2010/0238878 A1 * | 9/2010 | Jang | 370/329 |
| 2010/0260156 A1 | 10/2010 | Lee et al. | |
| 2014/0198805 A1 | 7/2014 | Qi et al. | |

FOREIGN PATENT DOCUMENTS

| | | |
|---|---|---|
| CN | 101 777 973 | 7/2010 |
| CN | 101 810 026 | 8/2010 |
| WO | 2010/095898 | 8/2010 |
| WO | 2010/107264 | 9/2010 |

* cited by examiner

METHOD AND DEVICE FOR ACCESSING WIRELESS NETWORK

CROSS-REFERENCE TO RELATED APPLICATIONS

This application claims the priority of a Chinese patent application No. 201110081288.6 filed on Mar. 31, 2011 and titled "WIRELESS COMMUNICATION METHOD", which is incorporated herein by reference in its entirety.

This application claims the priority of a Chinese patent application No. 201110081193.4 filed on Mar. 31, 2011 and titled "METHOD, SYSTEM AND DEVICE FOR WIRELESS COMMUNICATION", which is incorporated herein by reference in its entirety.

This application claims the priority of a Chinese patent application No. 201110130194.3 filed on May 19, 2011 and titled "COMMUNICATION SYSTEM", which is incorporated herein by reference in its entirety.

This application claims the priority of a Chinese patent application No. 201110189226.7 filed on Jul. 6, 2011 and titled "METHOD AND DEVICE FOR ACCESSING WIRELESS NETWORK", which is incorporated herein by reference in its entirety.

This application claims the priority of a Chinese patent application No. 201210035791.2 filed on Feb. 16, 2012 and titled "METHOD AND DEVICE FOR ACCESSING WIRELESS NETWORK", which is incorporated herein by reference in its entirety.

This application claims the priority of a Chinese patent application No. 201210050554.3 filed on Feb. 29, 2012 and titled "METHOD AND DEVICE FOR ACCESSING WIRELESS NETWORK", which is incorporated herein by reference in its entirety.

FIELD OF THE INVENTION

The present invention relates to the field of wireless communications, and in particular, to a method and device for accessing a wireless network.

BACKGROUND OF THE INVENTION

In recent years, wireless communication systems have been developed rapidly. For example, wireless Local Area Network (WLAN) technologies based on IEEE 802.11 (i.e. WiFi), a Bluetooth system based on IEEE 802.15, and Femto technologies oriented to indoor applications that are derived from a mobile communication system have been widely used.

The WiFi technology based on IEEE 802.11 is the most extensively used wireless network transmission technology at present. A WiFi system is defective for its relatively low system efficiency and significant waste of wireless resources due to the employment of a Carrier Sense Multiple Access with Collision Avoidance (CSMA/CA) mechanism. An essential reason for such a defect lies in that the CSMA/CA mechanism is a random multi-access mechanism based on competition, and there exist competitions for the access right to wireless resources between a Central Access Point (CAP) and a Station (STA) or between different STAs due to the CSMA/CA mechanism. Simultaneous competitions for a wireless channel will result in a collision, thus leading to the wireless resource waste. To avoid such collision, the CSMA/CA mechanism requires the CAPs or STAs to retreat randomly from the competition for the wireless channel. If all of the CAPs and STAs retreat, the wireless channel is not utilized even it is idle, causing significant waste of the wireless channel. Therefore, the system efficiency of IEEE 802.11 is relatively low. For example, although the peak rate at the physical layer in an IEEE 802.11g system may reach 54 Mbps, the reachable peak rate of a large-packet download service at the Transmission Control Protocol (TCP) layer is no more than 30 Mbps. Despite of the above defects, the IEEE 802.11 system is flexible and does not rely on a centralized control mechanism, so that the device costs are relatively low.

A Femto technology based on 3GPP standards, which is derived from a mobile communication system, is a new technology intended for indoor coverage. Since about 70% of data services is conducted in doors according to data statistics of the 3G system, an indoor high-speed data access solution is especially important. A Femto base station, which is named as a Pico Base Transceiver Station, is small in volume (like in WiFi technologies) and flexible in deployment. The Femto base station inherits almost all features of a mobile communication system due to its derivation from the mobile communication system. Considering its limited coverage range and a relatively small number of access users, the Femto device is designed with a decreased processing capability, to reduce the device costs. In terms of a duplexing manner, Femto base stations may operate in two duplexing mechanisms, i.e. a Frenqucy Division Duplexing (FDD) and a Time Division Duplexing (TDD), just like the mobile communication system. Because FDD uplink and downlink carrier resources are symmetric, certain resource waste is caused for a data service in a FDD system due to a service feature that uplink and downlink data flow of the data service are asymmetric. In a TDD system, however, both uplink and downlink operate at the same carrier, and different wireless resources are allocated for the uplink and downlink through the division of time resources, thus the TDD system can be more suitable for a data service characterized by asymmetric uplink and downlink service demands, in comparison with an FDD system. In the mobile communication system (including a Femto system), however, due to the static allocation of uplink and downlink resources in the TDD duplexing manner, it is difficult to implement dynamic matching between service demands and resource division in the case of various data services with different demands, such as web surfing, mobile videos and mobile games. Due to the employment of a centralized control mechanism based on scheduling, and hence there is no wireless resource waste that is caused by competition collision between the Base Station or CAP and a User Equipment or between User Equipments and random retreat, the Femto technology is advantageous for a higher link efficiency in comparison with the WiFi technology.

A demand for accessing a wireless network exists for wireless communication systems.

SUMMARY OF THE INVENTION

Therefore, it is an object of the present invention to provide a method for accessing a wireless network.

It is another object if the invention to provide a wireless network accessing device.

A brief summarization is given below to provide a basic understanding of some aspects of the embodiments disclosed. This summarization, which is not a general commentary, is not to determine the key/important component elements, or to describe the scope of these embodiments. The only object thereof is to simply present some concepts, acting as a preamble of the subsequent detailed illustration.

The technical solutions of the invention are as follows.

A method for accessing a wireless network includes a synchronization acquiring process, which includes:

detecting a physical frame on the current subchannel;

parsing a system information channel (SICH) and a control channel (CCH) in the detected physical frame, wherein the SICH indicates the structure of the physical frame, and the CCH indicates system resource allocation; and acquiring a system parameter from the physical frame by using a result of the parse.

In an embodiment, the synchronization acquiring process further includes: turning to the next subchannel and continuing to detect a physical frame until each subchannel in a channel list is detected, after acquiring the system parameter.

Optionally, the method further includes: taking all the subchannels, from which the system parameter has been acquired, as available subchannels, and selecting any one from the available subchannels.

Optionally, the method further includes a synchronization maintaining process, which includes:

continuing to detect a physical frame on the selected subchannel;

parsing the SICH and the CCH in the detected physical frame; and detecting the BCF from the detected physical frame by using a result of the parsing, to acquire a system parameter.

As an alternative embodiment, the process for maintaining synchronization further includes:

starting an SICH timer and a BCF timer when detecting of the physical frame is started;

determining whether the SICH is successfully parsed before the SICH timer is expired, and if so, resetting the SICH timer; otherwise, the synchronization acquiring process is performed again starting from the selected subchannel according to the channel list, until a system parameter is acquired on a subchannel, which is then taken as the selected subchannel for performing the synchronization maintaining process again; and determining whether the BCF is detected before the BCF timer is expired, and if so, resetting the BCF timer and continuing to detect a physical frame on the selected subchannel; otherwise, the synchronization acquiring process is performed again starting from the selected subchannel according to the channel list, until a system parameter is acquired on a subchannel, which is then taken as the selected subchannel for performing the synchronization maintaining process again.

As another alternative embodiment, the synchronization maintaining process further includes:

starting an SICH timer and a BCF timer when starting to detect a physical frame;

determining whether the SICH is parsed successfully before the SICH timer is expired, and if so, resetting the SICH timer; otherwise, performs the synchronization acquiring process again according to the channel list; and determining whether the BCF is detected before the BCF timer is expired, and if so, resetting the BCF timer and continuing to detect a physical frame on the selected subchannel; otherwise, performing the synchronization acquiring process according to the channel list.

As a yet another alternative embodiment, the synchronization maintaining process further includes:

starting an SICH timer and a BCF timer when starting to detect a physical frame;

determining whether the SICH is parsed successfully before the SICH timer is expired, and if so, resetting the SICH timer; otherwise, reselecting a subchannel from the available subchannels to perform the synchronization maintaining process; and determining whether the BCF is detected before the BCF timer is expired, and if so, resetting the BCF timer and continuing to detect a physical frame on the selected subchannel; otherwise, reselecting a subchannel from the available subchannels to perform the synchronization maintaining process.

Optionally, during the synchronization maintaining process, the starting time of the next physical frame is determined by using the SICH in the current detected physical frame.

In an embodiment, during the synchronization acquiring process, the physical frame is detected by detecting the frame header of the physical frame.

Optionally, if no frame header is detected on the current subchannel, the detecting is continued on the current subchannel until waiting time of the subchannel elapses, and then the next subchannel is selected to continue the detecting of a physical frame.

In an embodiment, during the synchronization acquiring process, if the parsing of the SICH and the CCH fails, the detecting of a physical frame on the current subchannel is continued until waiting time of the subchannel elapses, and then the next subchannel is selected to continue the detecting of a physical frame.

In an embodiment, during the synchronization acquiring process, the process for acquiring the system parameter includes:

detecting a broadcast information frame (BCF) from the physical frame by using a parse result; and acquiring the system parameter from the BCF.

Optionally, when no BCF is detected from the physical frame, the detecting of a physical frame is continued on the current subchannel until the waiting time of the subchannel elapses, and then the next subchannel is selected to continue to detect a physical frame.

A wireless network accessing device includes a synchronization acquiring module including:

a first detecting unit, for detecting a physical frame on the current subchannel;

a first parsing unit, for parsing an SICH and a CCH in the physical frame detected by the first detecting unit, wherein the SICH indicates the structure of the physical frame, and the CCH indicates system resource allocation; and a first acquiring unit, for acquiring a system parameter from the physical frame detected by the first detecting unit by using a parse result of the first parsing unit.

In an embodiment, after acquiring the system parameter, the first acquiring unit triggers the first detecting unit to turn to the next subchannel and continue to detect a physical frame, until each subchannel in a predetermined channel list is detected.

Optionally, the first acquiring unit is further adapted to take all the subchannels, from which the system parameter has been acquired, as available subchannels, and select any one from the available subchannels.

Optionally, the wireless network accessing device further includes a synchronization maintaining module, which includes:

a second detecting unit, for continuing to detect a physical frame on the subchannel selected;

a second parsing unit, for parsing the SICH and the CCH in the physical frame detected by the second detecting unit; and a second acquiring unit, for detecting the BCF from the physical frame detected by the second detecting unit by using the parse result of the second parsing unit, to acquire a system parameter.

As an alternative embodiment, the synchronization maintaining module further includes: an SICH timer, a BCF timer and a determining unit;

the second detecting unit is further adapted to start the SICH timer and the BCF timer when starting to detect a physical frame;

the determining unit is adapted to determine whether the second parsing unit successfully parses the SICH before the SICH timer is expired, and if so, resetting the SICH timer; otherwise, triggering the synchronization acquiring module to operate again starting from the selected subchannel according to the channel list; and the determining unit is further adapted to determine whether the second acquiring unit detects the BCF before the BCF timer is expired, and if so, resetting the BCF timer and triggering the second detecting unit to continue to detect a physical frame on the selected subchannel; otherwise, triggering the synchronization acquiring module to operate again starting from the selected subchannel according to the channel list; and during the operation performed again, the first acquiring unit is further adapted to, after acquiring the system parameter on a subchannel, directly trigger the synchronization maintaining module to operate again by taking the subchannel as the selected subchannel.

As an alternative embodiment, the synchronization maintaining module further includes: an SICH timer, a BCF timer and a determining unit;

the second detecting unit is further adapted to start the SICH timer and the BCF timer when starting to detect a physical frame; and the determining unit is adapted to determine whether the second parsing unit successfully parses the SICH before the SICH timer is expired, and if so, resetting the SICH timer; otherwise, triggering the synchronization acquiring module to operate again according to the channel list; the determining unit is further adapted to determine whether the second acquiring unit detects the BCF before the BCF timer is expired, and if so, resetting the BCF timer and triggering the second detecting unit to continue to detect a physical frame on the selected subchannel; otherwise, triggering the synchronization acquiring module to operate again according to the channel list.

As an alternative embodiment, the synchronization maintaining module further includes: an SICH timer, a BCF timer and a determining unit;

the second detecting unit is further adapted to start the SICH timer and the BCF timer when starting to detect a physical frame; and the determining unit is adapted to determine whether the second parsing unit successfully parses the SICH before the SICH timer is expired, and if so, resetting the SICH timer; otherwise, triggering the first acquiring unit to reselect one from the available subchannels; and the determining unit is further adapted to determine whether the second acquiring unit detects the BCF before the BCF timer is expired, and if so, resetting the BCF timer and triggering the second detecting unit to continue to detect a physical frame on the selected subchannel; otherwise, triggering the first acquiring unit to reselect one from the available subchannels.

Optionally, the second detecting unit determines the starting time of the next physical frame on the subchannel selected by using the SICH in the current detected physical frame.

In an embodiment, the first detecting unit detects a physical frame by detecting the frame header of the physical frame.

Optionally, if no frame header is detected on the current subchannel, the first detecting unit continues to detect on the current subchannel until waiting time of the subchannel elapses, and then turns to the next subchannel and continues to detect a physical frame.

In an embodiment, if failing to parse the SICH and the CCH, the first parsing unit triggers the first detecting unit to continue to detect a physical frame on the current subchannel until waiting time of the subchannel elapses, and then triggers the first detecting unit to turn to the next subchannel and continue to detect a physical frame.

In an embodiment, the first acquiring unit detects a broadcast info nation frame BCF from the physical frame and then acquires a system parameter from the BCF.

Optionally, when failing to detect the BCF, the first acquiring unit triggers the first detecting unit to continue to detect a physical frame on the current subchannel until waiting time of the subchannel elapses, and triggers the first detecting unit to turn to the next subchannel and continue to detect a physical frame.

As can be seen in the method for accessing a wireless network according to the invention, system synchronization is acquired for the case in which the structure of a physical frame may be configured dynamically.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

DETAILED DESCRIPTION OF THE EMBODIMENTS

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

Figure 1:
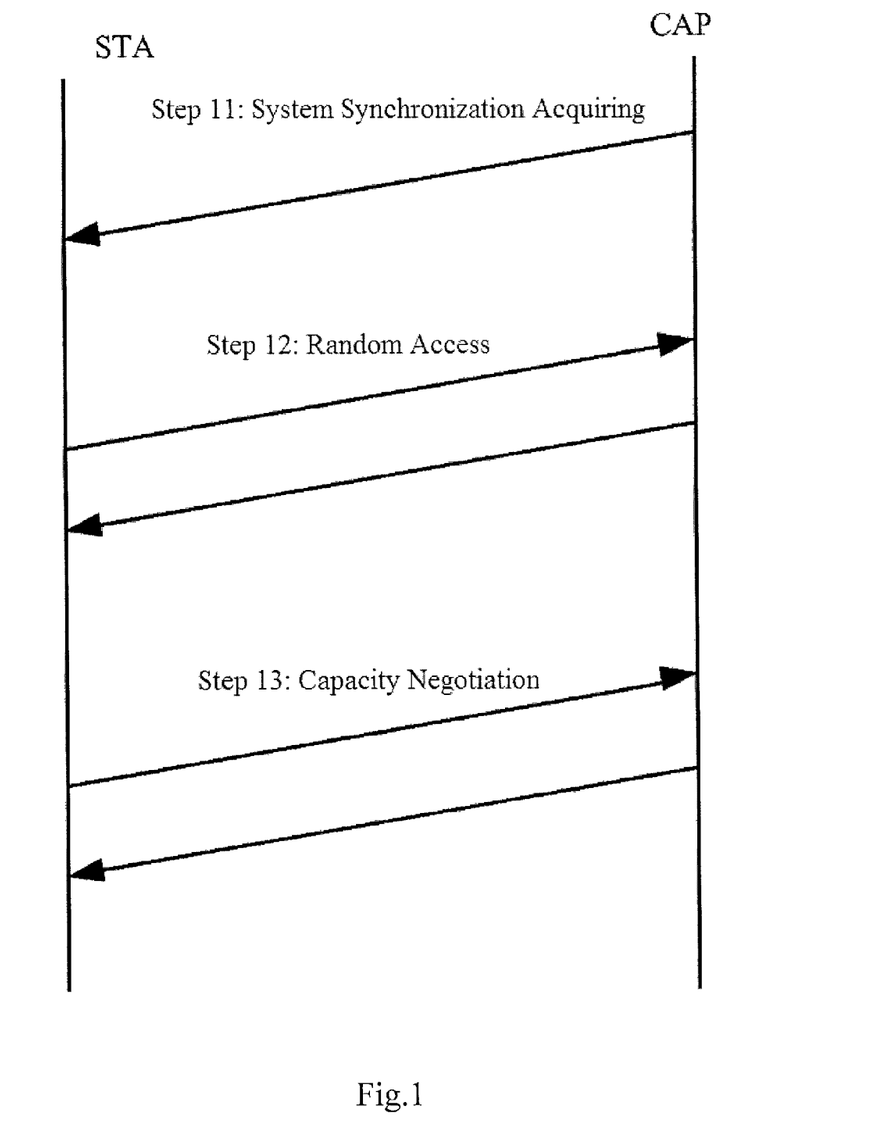
FIG. 1 is a flow chart of a method for accessing a wireless network of the invention.

FIG. 1 is a flow chart of the method for accessing a wireless network of the invention, which includes: a step 11 of acquiring system synchronization, here, the acquiring of system parameters is equivalent to performing a system initialization process; and a step 12 of randomly accessing a CAP, and conducting capacity negotiation with the CAP.

The method for accessing a wireless network in the invention refers to the process for acquiring system synchronization in the flow shown in FIG. 1.

Figure 2:
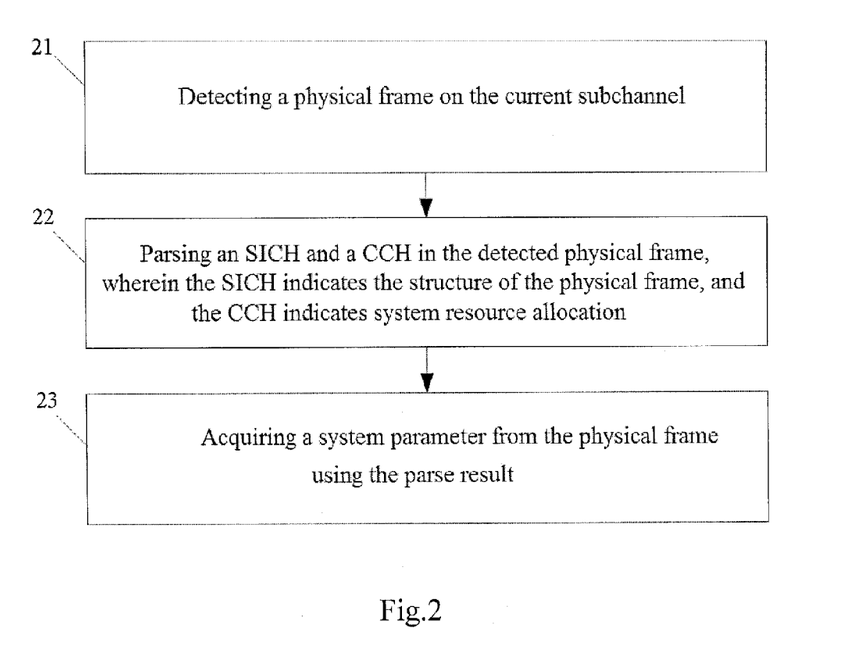
FIG. 2 shows a method for accessing a wireless network of the invention.

FIG. 2 shows a method for accessing a wireless network of the invention, which includes a process for acquiring synchronization including steps 21-23.

At step 21, a physical frame is detected on the current subchannel.

At step 22, a System Information Channel (SICH) and a Control Channel (CCH) in the physical frame detected are parsed, where the SICH indicates the structure of the physical frame, and the CCH indicates system resource allocation.

The method for accessing a wireless network of the invention is proposed for the case in which the structure of a physical frame may be configured dynamically, here, the SICH in the physical frame indicates the structural configuration of the physical frame, for example, the existence and time length of each channel in the physical frame.

The CCH in the physical frame indicates system resource allocation, including an indication of resources allocated to system parameters.

At step 23, system parameters are acquired from the physical frame using the parse result.

Thus, with the method for accessing a wireless network of the invention, acquisition of system synchronization is realized for the case in which the structure of a physical frame may be configured dynamically.

Before detailed description of alternative embodiments of the method according to the invention, an application scene of the alternative embodiments is provided below. The application scene is merely a specific example and does not limit the scope of the invention.

Figure 3:
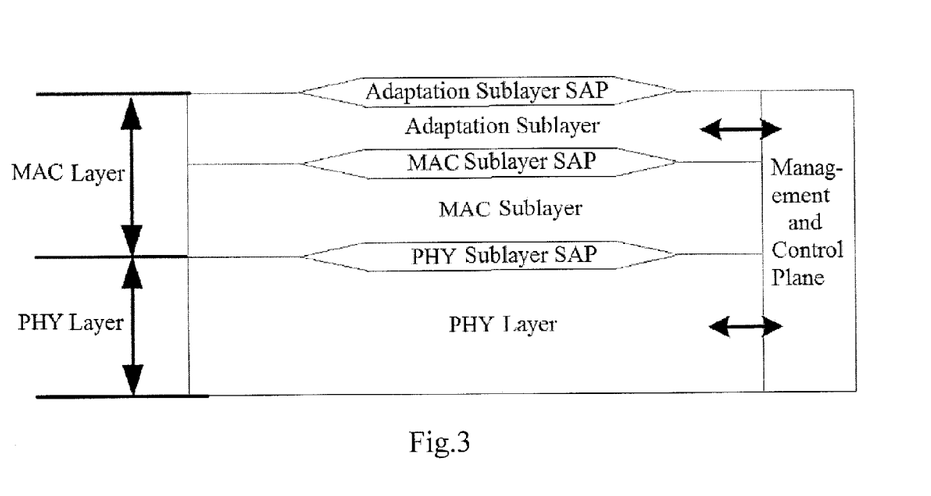
FIG. 3 shows a reference model of an Enhanced Ultra-High Throughput (EUHT) WLAN system.

FIG. 3 shows a reference model of an EUHT system.

The system reference model shown in FIG. 3 preliminarily refers to an air interface reference model, which includes: a Media Access Control (MAC) layer and a Physical (PHY) layer, the main function of each layer is outlined as follows.

①MAC Layer Including an Adaptation Sublayer and an MAC Sublayer

The adaptation sublayer mainly provides a function of mapping and converting between external network data and an MAC layer service protocol unit (MSDU). The MSDU refers to information delivered between MAC Service Access Points (SAPs) as a unit.

The MAC sublayer is configured for management and control of the system and support for specific functions of the PHY layer, in addition to offering a media access control function.

②PHY Layer

The PHY layer mainly provides a PHY transmission mechanism for mapping an MPDU to a corresponding physical channel, for example, Orthogonal Frequency Division Multiplex (OFDM) and Multi-Input Multi-Output (MIMO) technologies. The MPDU refers to a data unit exchanged between two peer MAC entities through a PHY layer service.

Figure 4:
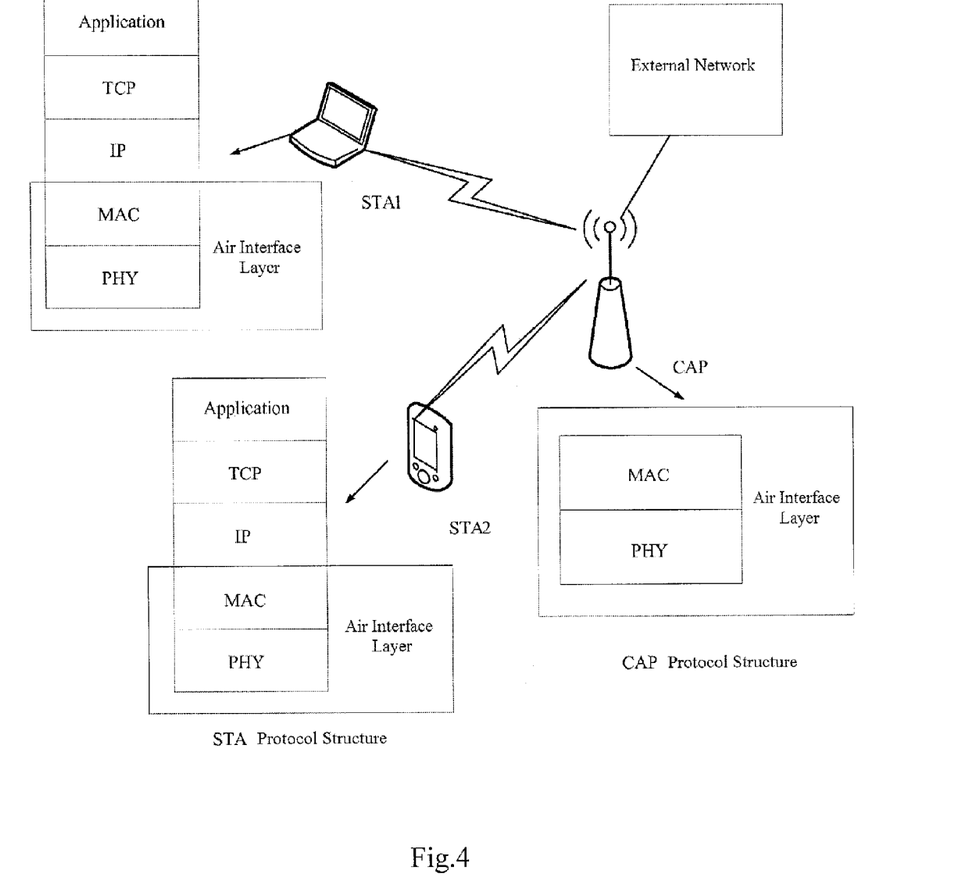
FIG. 4 shows the construction of an access system of the EUHT system.

FIG. 4 shows the construction of the access system of an EUHT system, which includes a CAP and an STA. The STA may be various data devices such as a PDA, a notebook, a photo camera, a video camera, a mobile phone, a tablet PC and a pad. As shown in FIG. 4, stations STA1 and STA2 access to a CAP via an air interface protocol, and the CAP in turn establishes communication with the existing external network (for example, an LP backbone network and an Ethernet) in a wired or wireless mode. The protocol structure of the CAP involves the MAC and PHY layers, and the protocol structure of the STA involves an application (Application) layer, a transmission control (TCP) layer, a network (IP) layer, an MAC layer and a PHY layer.

Figure 5:
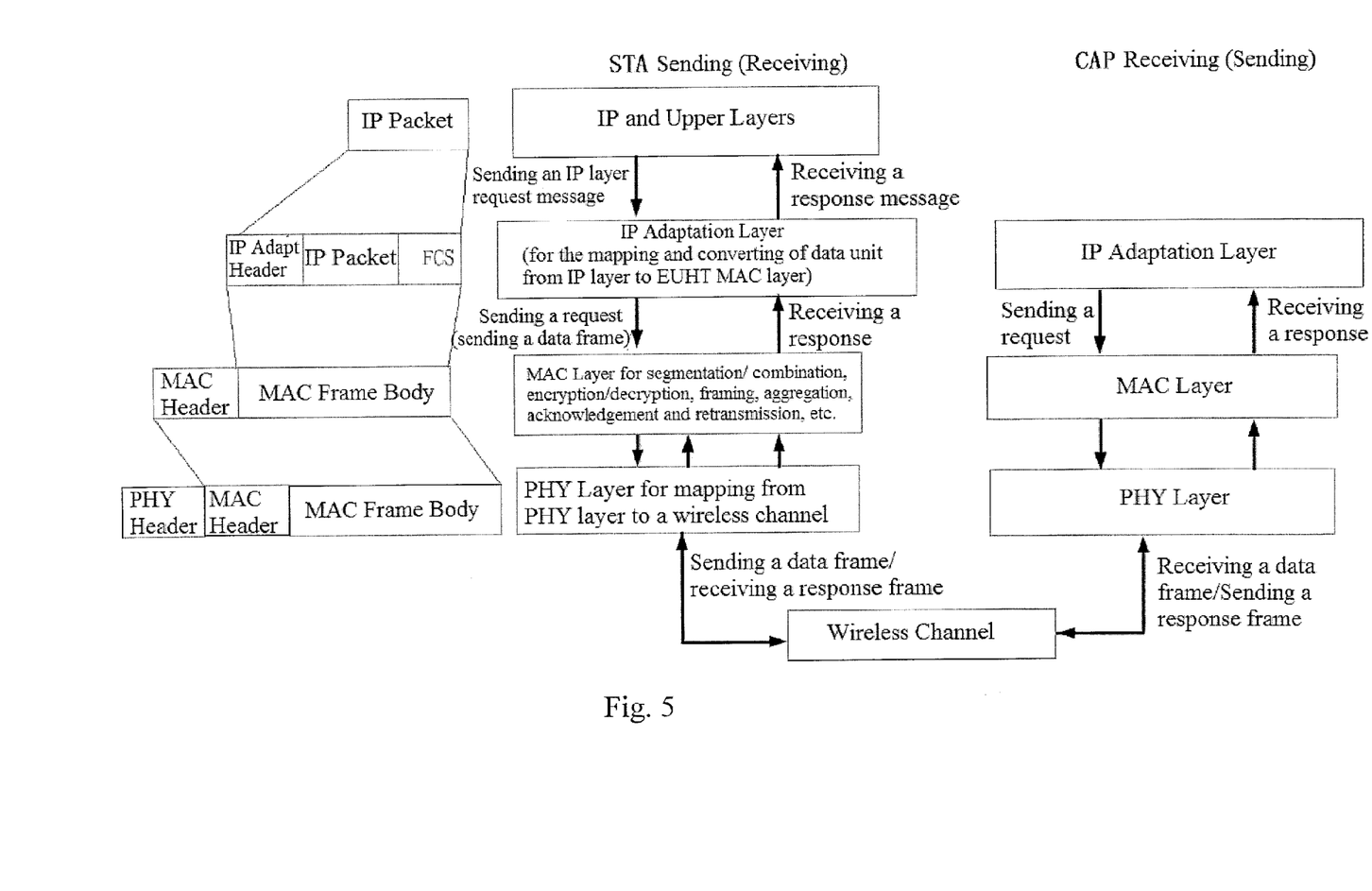
FIG. 5 shows a process of sending and receiving protocol data between the STA and the CAP in the EUHT system.

Based on the protocol structure shown in FIG. 4, FIG. 5 shows a process of sending and receiving protocol data between a STA and a CAP. For example, in the case data transmission from an STA to a CAP, the STA processes and packages application data (for example, VoIP, video, etc.) via the application layer and the TCP/IP layer, and sends the processed and packaged application data to an IP adaptation sublayer in the form of an IP packet, which is converted and mapped by the IP adaptation sublayer and then sent to an MAC sublayer to undergo processes such as segmentation, encryption, framing and aggregation, and then received and mapped to a wireless channel for data transmission at the PHY layer.

In an EUHT system, both the STA and the CAP may support frequencies of 20 MHz, 40 MHz and 80 MHz, a channel list is predetermined in the system to indicate subchannels thereof, and the subchannels may contain operating subchannels for one or more CAPs.

The following table 1 shows an example of a predetermined channel list at a 2.4 GHz frequency band.

TABLE 1

| Channel No. | Carrier Center Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |
| 13 | 2472 |

Figure 6:
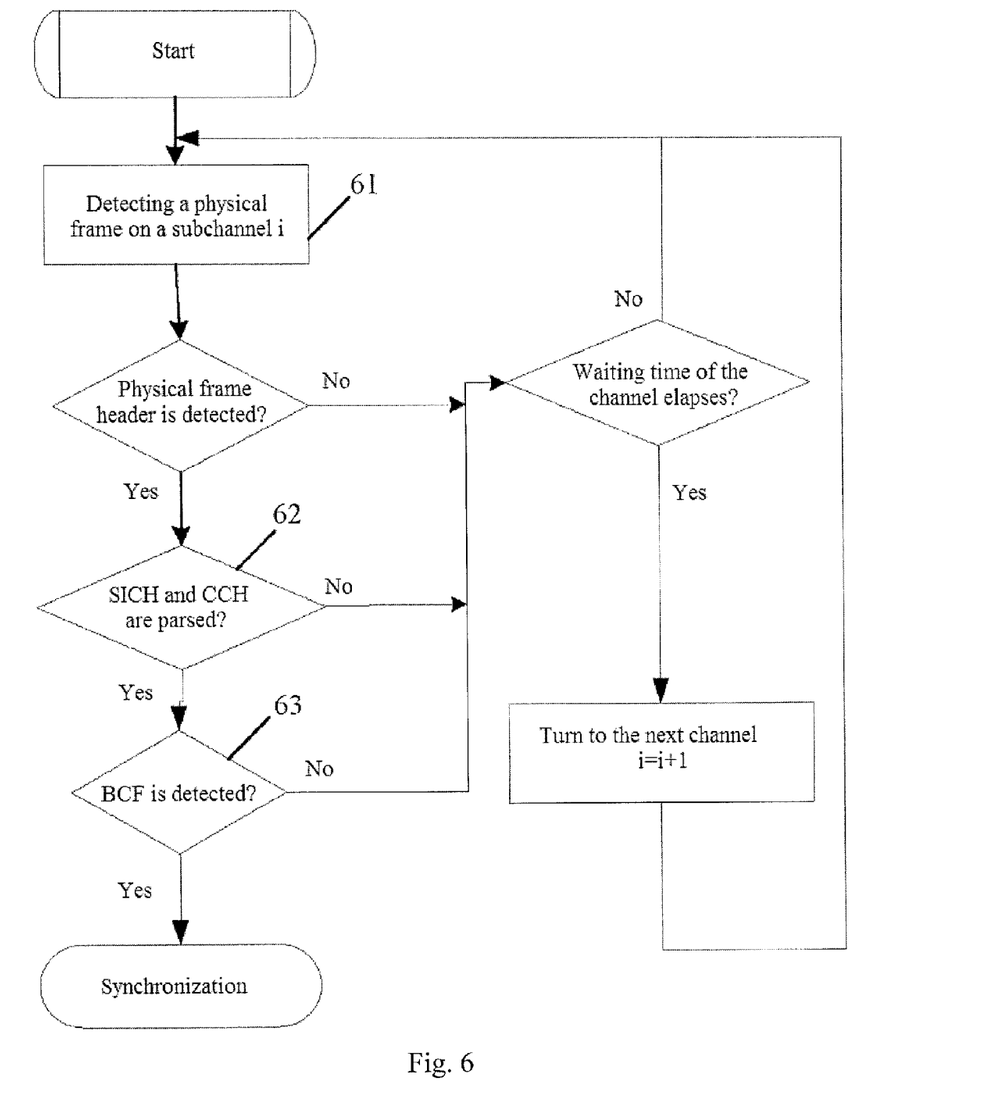
FIG. 6 is a flow chart of the method for accessing a wireless network according to an embodiment of the invention.

FIG. 6 is a flow chart of the method for accessing a wireless network according to an embodiment of the invention, which includes a process for acquiring synchronization, and the process for acquiring synchronization includes steps 61-63 below.

At step 61, a physical frame is detected on the current subchannel, specifically, it is determined whether a frame header of a physical frame is detected on the current subchannel, and if so, step 62 is performed; otherwise, the detection is performed again until waiting time of the subchannel elapses, and then the next subchannel is selected to proceed with step 61.

At step 62, it is determined whether the SICH and the CCH in the physical frame can be parsed, and if so, step 63 is performed; otherwise, step 61 is performed again until the waiting time of the subchannel elapses, and then the next subchannel is selected to proceed with step 61.

In the physical frame to which the invention aims, the location and time length of the preamble and the SICH are predetermined, but not configured dynamically. The CCH is located in an adjacent location subsequent to the SICH, and the time length of the CCH may be configured dynamically.

The SICH indicates the structural configuration of the physical frame, and specifically indicates the existence and/or time length of each channel in the current physical frame. For example, for some channel with a fixed time length, 1 bit in the SICH may be used to indicate the existence of such channel, and the time length of the channel is implicitly indicated; for some channel with an unfixed time length, multiple bits in the SICH may be used for indicating; in the case of CCH, for example, 6 bits in the SICH may be used for indicating the CCH, and up to 63 OFDM symbols may be indicated, with one OFDM symbol being the minimum resource allocation unit; for example, these 6 bits may be 010000, which is 16 on a decimal basis and corresponds to 16 OFDM symbols.

By parsing the SICH, the location and time length of the CCH in the physical frame may be determined, and then a broadcast scheduling signaling may be detected from the CCH in the physical frame, to detect resources allocated to a broadcast information frame (BCF). The following table 2 gives an example of the broadcast scheduling signaling, and the BCF is transmitted in a signaling/feedback channel contained in the transmission channel, as shown in table 2. Here, bits $b_3b_2b_1b_0$ of 0000 means a resource indication of a downlink signaling/feedback channel; and a bit $b_{31}$ of 0 means the presence of a BCF, bits $b_{36}b_{35} \ldots b_{32}$ indicate a resource location, and bits $b_{39}b_{38}b_{37}$ indicates a resource length.

TABLE 2

| Bits | Definition Downlink | Uplink |
|---|---|---|
| $b_3b_2b_1b_0$ | Broadcast Type<br>$b_3b_2b_1b_0$ = 0000, resource indication of a downlink signaling/feedback channel<br>$b_3b_2b_1b_0$ = 0001, resource indication of an uplink signaling/feedback channel | |
| $b_7b_6b_5b_4$ | 20 MHz subchannel Bitmap, a plurality of subchannels may be provided with the same signaling/feedback channel | |
| $b_{16}b_{15}\ldots b_8$ | starting OFDM symbol of a signaling/feedback channel resource block, with a value from 1 to 511 | |
| $b_{22}b_{21}\ldots b_{17}$ | reserved | |
| $b_{28}b_{27}\ldots b_{23}$ | number of symbols occupied by a signaling/feedback channel, with a value from 0 to 63 | |
| $b_{30}b_{29}$ | reserved | 00: format 1<br>01: format 2<br>10-11: reserved |
| $b_{31}$ | 0: downlink broadcast channel allocation is valid;<br>1: downlink broadcast channel allocation is invalid | reserved |
| $b_{36}b_{35}\ldots b_{32}$ | starting index of signaling/feedback channel occupied by downlink broadcast channel, with a value from 1 to 32 | |
| $b_{39}b_{38}b_{37}$ | number of signaling/feedback channels occupied by downlink broadcast channel, with a value from 1 to 8 | |
| $b_{55}b_{54}\ldots b_{40}$ | reserved | |
| $b_{71}b_{70}\ldots b_{56}$ | 16-bit CRC scrambled by BSTAID | |

At step 63, it is determined whether the BCF is detected, and if so, downlink synchronization is conducted; otherwise, step 61 is performed again until the waiting time of the subchannel elapses, and then the next subchannel is selected to proceed with step 61.

The BCF is a broadcast configuration message, which is broadcast on all operating subchannels periodically by a CAP. The MAC address of the CAP is carried by the BCF, so that the STA can identify the sender of the BCF. Further, the BCF may carry system parameters.

The system parameters carried by the BCF may include various parameters that play an indicating role on subsequent network access processes or other processes after the network access.

The following table 3 gives an example of the information carried by the frame body of the BCF.

TABLE 3

| Information | Length (bit) | Remark |
|---|---|---|
| CAP MAC address | 48 | Unique identity of the CAP |
| Sequence number of operating channel | 8 | Minimum value of channel number occupied by CAP |

TABLE 3-continued

| Information | Length (bit) | Remark |
|---|---|---|
| operating bandwidth | 2 | operating bandwidth for broadcasting the CAP<br>0 represents 20 MHz;<br>1 represents 40 MHz;<br>2 represents 80 MHz;<br>3 preserved. |
| CAP-side antenna configuration | 3 | for indicating the maximum antenna configuration of the CAP side.<br>0 represents 1 antenna;<br>1 represents 2 antennas;<br>2 represents 3 antennas;<br>3 represents 4 antennas;<br>4 represents 5 antennas;<br>5 represents 6 antennas;<br>6 represents 7 antennas;<br>7 represents 8 antennas; |
| reserved | 3 | with a value of 0 by default |
| length of network alias | 8 | valid length of a network alias field with a value of 1 to 31 unit: byte |
| network alias | 248 | a string starting with a letter or digit, with the maximum length of 31 bytes |
| time stamp | 64 | a common clock provided in the CAP, for system synchronization during STA initialization, with a unit of µs. |
| BCF interval | 16 | indicating the cycle of a BCF, with a unit of ms. |
| minimum window for random access retreat | 4 | for controlling a random access retreat window, the size of the minimum window is from 0 to 2n − 1 |
| minimum window for scheduling request retreat | 4 | for controlling a retreat window of a competition-based resource request, the size of the minimum window is from 0 to 2n − 1 |
| maximum window for random access retreat | 8 | for controlling a random access retreat window, the size of the maximum window is from 0 to 2n − 1 |
| maximum window for scheduling request retreat | 8 | for controlling the retreat window of a competition-based resource request, the size of the maximum window is from 0 to 2n − 1 |
| CAP transmission power | 8 | indicating the current transmission power of the CAP given a signed decimal number n corresponding to this field, n = −128~127(the negative value is represented in the form of a base complement):<br>the CAP transmission power is ″dBm. |
| reserved | 5 | with a value of 0 by default |
| downlink detection pilot pattern | 3 | indicating an index of the downlink detection pilot pattern |
| location of downlink detection channel | 8 | indicating the location of the downlink detection channel in the downlink transmission channel (DL-TCH), and corresponding to a decimal number n = 0~255; the downlink detection channel is used to divide the DL-TCH channel into two parts, the latter part of which includes totally n OFDM symbols. |
| demodulation pilot time-domain interval 0 | 7 | number of OFDM symbols of demodulation pilot time-domain interval (short interval configuration) |
| demodulation pilot time-domain interval 1 | 9 | number of OFDM symbols of demodulation pilot time-domain interval (long interval configuration) |
| DGI | 2 | solution of time for conversion from downlink to uplink<br>0: the guard interval includes 2 OFDM symbol cycles;<br>1: the guard interval includes 4 OFDM symbol cycles;<br>2~3: preserved |
| UGI | 2 | solution of time for conversion from uplink to downlink<br>0: the guard interval includes 2 OFDM symbol cycles;<br>1: the guard interval includes 4 OFDM symbol cycles (processing delay);<br>2~3: preserved |
| UL-RACH channel format | 2 | 00: random access format 1<br>01: random access format 2<br>10: random access format 3<br>11: preserved |
| reserved | 10 | with a value of 0 by default |

As shown in Table 3, the information carried in the BCF may be divided as follows:

1) MAC address of CAP: which may be used by the STA to identify the CAP that sends the BCF;

2) sequence number of operating channel and operating bandwidth of CAP: in addition to the current subchannel including the detected BCF, other operating subchannels of the CAP broadcasting the BCF may be determined by the STA in conjunction with such sequence number of an operating channel and an operating bandwidth;

3) antenna configuration of CAP: which is used by the STA after it's successful access to a wireless network;

4) network alias: which denotes the network name, to allow the STA to select a network for accessing;

5) length of network alias: which indicates the length of the network alias field, and a fixed length of the network alias field is beneficial to save overhead and lower parse deviation;

6) time stamp indicating the common system clock: the STA may adjust its clock according to the time stamp;

7) BCF interval indicating the BCF broadcast cycle: after acquiring a system parameter for the first time, the STA needs to confirm its alive contact with the CAP by receiving an SICH and a BCF continuously, and the STA may periodically acquire the BCF according to the BCF interval;

8) collision avoidance parameter: which includes the minimum window for random access retreat, the maximum window for random access retreat, the minimum window for scheduling request retreat and the maximum window for scheduling request retreat; when a collision occurs among a plurality of STAs during the subsequent random access process, the STA may retreat according to the minimum and the maximum windows for random access retreat; and when a collision occurs between scheduling requests, the STA may also retreat according to the minimum and the maximum windows for scheduling request retreat; the specific method for retreating will be described in detail below;

9) CAP transmission power: after its successful access to a wireless network, the STA may perform an open-loop power control according to the transmission power;

10) Structural parameter of physical frame, which includes: DGI for indicating the time for conversion from downlink to uplink, and UGI for indicating the time for conversion from uplink to downlink; a location of a downlink detection channel, for indicating the starting location of the downlink detection channel in the downlink transmission channel; a downlink detection pilot pattern, for indicating an index of the downlink detection pilot pattern; and a demodulation pilot time-domain interval, for indicating the time domain interval of the demodulation pilot.

The structural parameter of physical frame carried in the BCF indicates the partial structure of the physical frame that usually will not be changed during the dynamic configuration of the physical frame structure, and thus is carried and indicated generally in the BCF, without repeated indication of such structural parameter in the SICH, thereby saving SICH overhead.

11) uplink random access channel (UL-RACH) format for indicating the random access format: in the invention, different formats of uplink random access channels are provided for different random access distances to support a larger coverage, so that the STA can select a format matching the random access distance through the uplink random access channel format indicated in the BCF.

Depending on a specific application demand, the CAP may carry, in the generated BCF, one or more items of the information shown in table 3, and then broadcast the generated BCF.

After acquiring a system parameter on a certain subchannel, the STA turns to the next subchannel to proceed with step 61, until each subchannel in the channel list is scanned once, thereby completing the process for acquiring synchronization.

After each subchannel in the channel list is scanned, the STA might have acquired system parameters on one or more subchannels, which may be operating subchannels of the same CAP, or operating subchannels of different CAPs. The STA takes all the subchannels, from which system parameters have been acquired, as available subchannels, and selects any one of the available subchannels as the subchannel on which the synchronization maintaining process is subsequently performed, and at the same time, the CAP to be accessed is also determined.

The method of the invention further includes a synchronization maintaining process including: continuing to detect a physical frame on the selected subchannel; parsing an SICH and a CCH in the detected physical frame; and detecting a BCF from the detected physical frame using the parse result, to acquire a system parameter.

Figure 7:
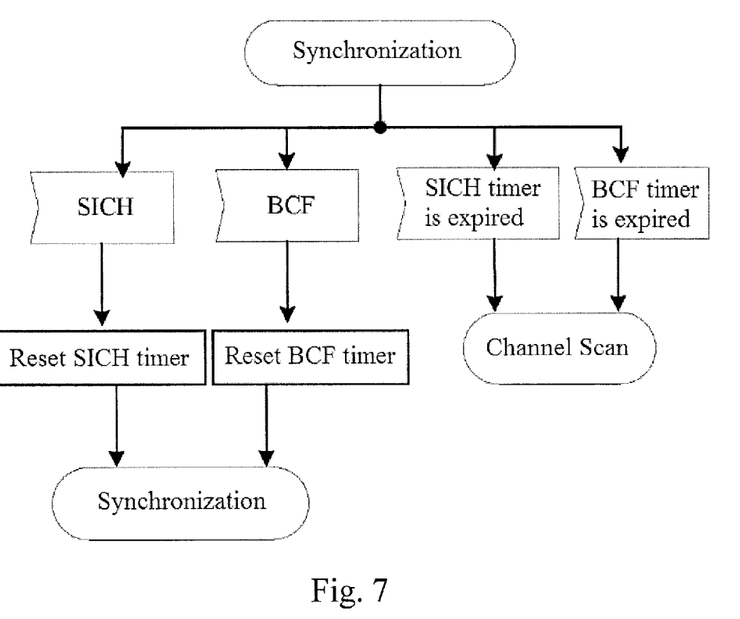
FIG. 7 is a flow chart of the process in which the STA maintains downlink synchronization.

Specifically, FIG. 7 shows a flow chart of a process in which an STA maintains synchronization according to an embodiment of the invention. As shown in FIG. 7, during the synchronization maintaining process, an SICH timer and a BCF timer are present, and the STA continues to detect a physical frame on the selected subchannel and stars the SICH timer and the BCF timer. If the SICH is parsed successfully before the SICH timer expires, the SICH timer is reset; if a BCF is detected successfully before the BCF timer expires, the BCF timer is reset, and the detecting of a physical frame on the selected subchannel is continued. If the respective information is not detected when any one of the two timers expires, it is regarded that the STA loses synchronization and needs to rescan the channels. Here, rescanning the channels may be conducted in the following two ways.

In a first way, the process for acquiring synchronization is performed starting from the selected subchannel according to the channel list, until the system parameter is acquired on a certain subchannel, which is then taken as the selected subchannel on which the synchronization maintaining process is to be performed again; and if no available subchannel is detected until the last subchannel in the channel list is scanned, the scanned is continued with the first subchannel in the channel list.

In a second way, the process for acquiring synchronization is performed again according to the channel list, that is, each channel in the channel list is scanned, to select an available subchannel on which the synchronization maintaining process is to be performed again.

The above two ways may be applied in the following two scenes:

1) only one available subchannel is determined after the process for acquiring synchronization ends; and 2) after the process for acquiring synchronization ends, if the preset time elapses, the available subchannels determined during the process for acquiring synchronization will no longer be considered, which means that the channel list is expired.

However, the above two ways are not necessarily applied in the above two scenes; instead, any of the ways may be taken as a preselected operation mode.

In another optional way, after losing synchronization, the STA may take another available subchannel as the selected subchannel and performs the synchronization maintaining process again. This optional way may be applied in such an application scene that: more than one available subchannel is determined after the process for acquiring synchronization ends, and the current channel list is not expired. However, if the system is not limited by the expiration of the channel list, this optional way may also be taken as the preselected operation mode; and if more than one available subchannel is determined when the process for acquiring synchronization is performed for the first time, this operation mode may be used.

The timing of the SICH timer and the BCF timer may be set flexibly as desired.

It may be seen that, in the synchronization maintaining process, the STA continuously detects a physical frame on the selected subchannel and continuously parses an SICH and detects a BCF. Because an SICH indicates the structure of the physical frame including the SICH, the STA may acknowledge the starting time of the next physical frame through the parse result of the current SICH during the synchronization maintaining process.

Figure 8:
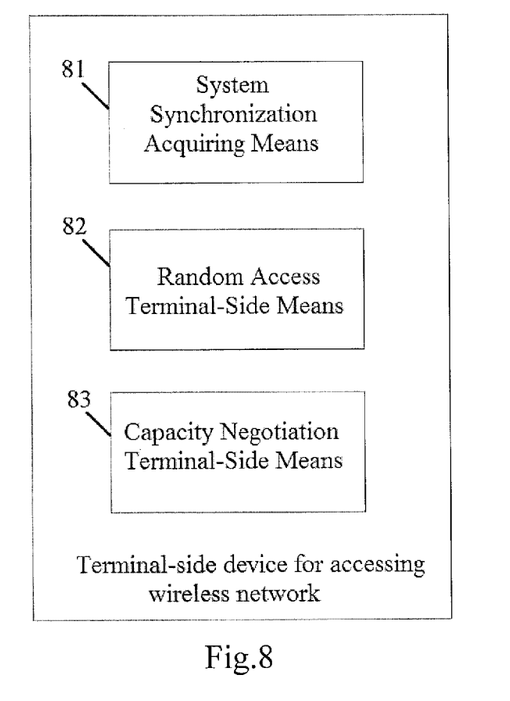
FIG. 8 is a structural representation of a terminal-side equipment that accesses a wireless network according to the invention.

FIG. 8 shows a structural representation of a terminal-side equipment that accesses a wireless network of the invention, and the device includes: a system synchronization acquiring means 81, a random access terminal-side means 82 and a capacity negotiation terminal-side means 83.

The system synchronization acquiring means 81 is adapted to perform a process for acquiring system synchronization with a CAP.

The random access terminal-side means 82 is adapted to randomly access the CAP.

The capacity negotiation terminal-side means 83 is adapted to perform capacity negotiation with the CAP.

The wireless network accessing device of the invention refers to the above system synchronization acquiring means 81.

The system synchronization acquiring means of the invention includes a synchronization acquiring module including: a first detecting unit, a first parsing unit and a first acquiring unit.

The first detecting unit is adapted to detect a physical frame on the current subchannel.

The first parsing unit is adapted to parse the SICH and the CCH in the physical frame detected by the first detecting unit, wherein the SICH indicates the structure of the physical frame, and the CCH indicates system resource allocation.

The first acquiring unit is adapted to acquire, by using the parse result of the first parsing unit, a system parameter from the physical frame detected by the first detecting unit.

Figure 9:
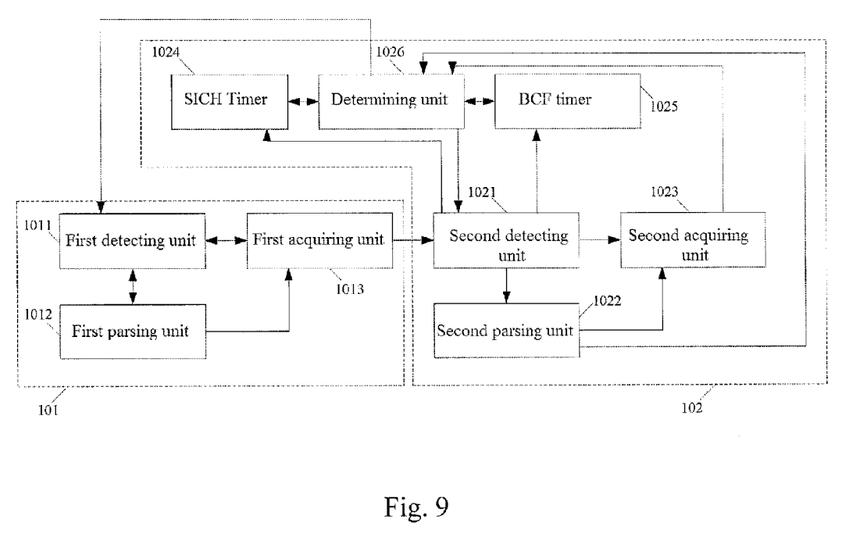
FIG. 9 is a structural representation of a system synchronization acquiring means according to an embodiment of the invention.

FIG. 9 is a structural representation of a system synchronization acquiring means of an embodiment of the invention, which includes a synchronization acquiring module 91 including: a first detecting unit 911, a first parsing unit 912 and a first acquiring unit 913.

The first detecting unit 911 is adapted to detect a physical frame on the current subchannel.

The first parsing unit 912 is adapted to resolve an SICH and a CCH in the physical frame detected by the first detecting unit 911, wherein the SICH indicates the structure of the physical frame, and the CCH indicates system resource allocation.

The first acquiring unit 913 is adapted to acquire, by using the parse result of the first parsing unit 912, a system parameter from the physical frame detected by the first detecting unit 911.

Further, after acquiring the system parameter, the first acquiring unit 913 may trigger the first detecting unit 911 to turn to the next subchannel for detecting a physical frame, until each subchannel in a predetermined channel list is detected.

Further more, the first acquiring unit 913 may take all the subchannels, from which the system parameters have been acquired, as available subchannels, and select any one from the available subchannels.

As an alternative embodiment, the first detecting unit 911 detects a physical frame by detecting the frame header of a physical frame on the current subchannel.

Further, if failing to detect a frame header on the current subchannel, the first detecting unit 911 continues detecting until the waiting time of the current subchannel elapses, and then turns to the next subchannel and continues to detect a physical frame.

As an alternative embodiment, when failing to parse the SICH and the CCH, the first parsing unit 912 triggers the first detecting unit 911 to operate again until the waiting time of the subchannel elapses, and then triggers the first detecting unit 911 to turn to the next subchannel and continue to detect a physical frame.

As an alternative embodiment, the first acquiring unit 913 detects a BCF from the physical frame, and then acquires a system parameter from the BCF.

Further, when failing to detect a BCF, the first acquiring unit 913 triggers the first detecting unit 911 to operate again until the waiting time of the subchannel elapses, and then triggers the first detecting unit 911 to turn to the next subchannel and continue to detect a physical frame.

In connection with the synchronization acquiring module 91, the system synchronization acquiring means of an embodiment of the invention further includes a synchronization maintaining module 92 including: a second detecting unit 921, a second parsing unit 922 and a second acquiring unit 923.

The second detecting unit 921 is adapted to continue to detect a physical frame on the selected subchannel.

The second parsing unit 922 is adapted parse an SICH and a CCH in the physical frame detected by the second detecting unit 921.

The second acquiring unit 923 is adapted to detect, by using the parse result of the second parsing unit 922, a BCF from the physical frame detected by the second detecting unit 921, to acquire a system parameter.

In a first alternative embodiment of the synchronization maintaining module 92, the synchronization maintaining module 92 further includes: an SICH timer 924, a BCF timer 925 and a determining unit 926.

The second detecting unit 921 is further adapted to start the SICH timer 924 and the BCF timer 925 when starting to detect a physical frame.

The determining unit 926 is adapted to determine whether the second parsing unit 922 succeeds in parsing the SICH before the SICH timer 924 is expired, and if so, reset the SICH timer 924; otherwise, the determining unit 926 triggers the synchronization acquiring module 91 to operate again according to the channel list. The determining unit 926 is further adapted to determine whether the second acquiring unit 923 detects a BCF before the BCF timer 925 is expired, and if so, reset the BCF timer 925 and trigger the second detecting unit 921 to continue to detect a physical frame on the selected subchannel; otherwise, the determining unit 926 triggers the synchronization acquiring module 91 to operate again according to the channel list.

In a second alternative embodiment of the synchronization maintaining module 92, the synchronization maintaining module 91 further includes: an SICH timer 924, a BCF timer 925 and a determining unit 926, like the structure shown in FIG. 9.

The second detecting unit 921 is further adapted to start the SICH timer 924 and the BCF timer 925 when starting to detect a physical frame.

The determining unit 926 is adapted to determine whether the second parsing unit 922 succeeds in parsing the SICH before the SICH timer 924 is expired, and if so, reset the SICH timer 924; otherwise, the determining unit 926 triggers the synchronization acquiring module 91 to operate again starting from the selected subchannel according to the channel list; and the determining unit 926 is further adapted to determine whether the second acquiring unit 923 detects a BCF before the BCF timer 925 is expired, and if so, reset the BCF timer 925 and trigger the second detecting unit 921 to continue to detect a physical frame on the selected subchannel; otherwise, the determining unit 926 triggers the synchronization acquiring module 91 to operate again starting from the selected subchannel according to the channel list.

Based on the above, during the operation performed again, the first acquiring unit 913 is further adapted to, after acquiring the system parameter on a subchannel, directly trigger the synchronization maintaining module 92 to operate again by taking this subchannel as the selected subchannel.

Figure 10:
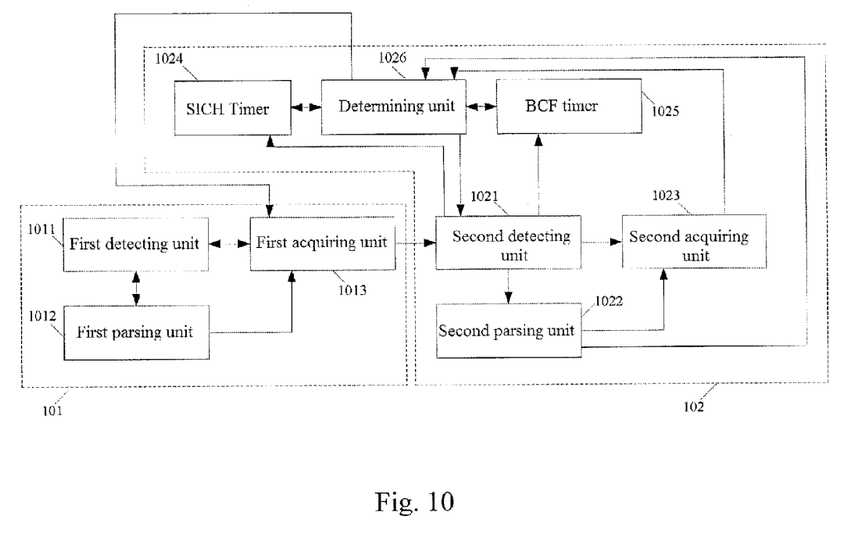
FIG. 10 is another structural representation of a system synchronization acquiring means according to an embodiment of the invention.

In a third alternative embodiment of the synchronization maintaining module 92, as shown in the structure of FIG. 10, the synchronization maintaining module 92 further includes: an SICH timer 924, a BCF timer 925 and a determining unit 926.

When starting to detect a physical frame, the second detecting unit 921 further starts the SICH timer 924 and the BCF timer 925.

The determining unit 926 is adapted to determine whether the second parsing unit 922 succeeds in parsing the SICH before the SICH timer 924 is expired, and if so, reset the SICH timer 924; otherwise, the determining unit 926 triggers the first acquiring unit 913 to reselect one from the available subchannels; and the determining unit 926 is further adapted to determine whether the second acquiring unit 923 detects a BCF before the BCF timer 925 is expired, and if so, reset the BCF timer 925 and trigger the second detecting unit 921 to continue to detect a physical frame on the selected subchannel; otherwise, the determining unit 926 triggers the first acquiring unit 913 to reselect one from the available subchannels.

In the above three alternative embodiments of the synchronization maintaining module 92, to comply with the application scene where the channel list would be expired, the system synchronization acquiring means may further include a module for determining whether the channel list is expired, which may monitor the operation of the synchronization acquiring module 91, start timing after the channel list scanning is completed by the synchronization acquiring module 91, and generate a result of channel list expiration when the preset time elapses. Alternatively, a module for determining whether the channel list is expired, if provided at the terminal side, may be directly used by the synchronization maintaining module 92 to obtain the result of whether the channel list is expired.

In the above three alternative embodiments of the synchronization maintaining module 92, the second detecting unit 921 may determine the starting time of the next physical frame by using the SICH in the current detected physical frame on the selected subchannel.

The structures and functions in the three embodiments as illustrated with the above FIGS. 9 and 10 may be integrated in the same synchronization maintaining module.

To establish time synchronization with the CAP, the system synchronization acquiring means of an embodiment of the invention may further include a synchronization unit, which is used for establishing synchronization with the CAP by using the system common clock among the system parameters.

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word. Additionally, any term "or" used in the claims or the specification intends to represent a "nonexclusive or".

What is claimed is:

1. A method for accessing a wireless network, comprising a synchronization acquiring process including:
   detecting a physical frame on a current subchannel;
   parsing a system information channel SICH and a control channel CCH in the detected physical frame, wherein the SICH indicates a structure of the physical frame, a location and time length of the CCH in the physical frame is determined by parsing the SICH, and the CCH indicates system resource allocation; and
   acquiring a system parameter from the physical frame by using a result of the parsing;
   wherein, the synchronization acquiring process further comprises:
   turning to a next subchannel and continuing to detect a physical frame until each subchannel in a channel list is detected, after acquiring the system parameter; and
   taking all subchannels, from which the system parameter has been acquired, as available subchannels, and selecting any one from the available subchannels;
   wherein, the method further comprises a synchronization maintaining process, which includes:
   continuing to detect a physical frame on the selected subchannel;
   parsing the SICH and the CCH in the detected physical frame; and
   detecting a broadcast information frame BCF from the detected physical frame by using a result of the parsing, to acquire a system parameter;
   wherein, the synchronization maintaining process further comprises:
   starting an SICH timer and a BCF timer when detecting the physical frame is started;
   determining whether the SICH is successfully parsed before the SICH timer is expired, and if so, resetting the SICH timer; otherwise, the synchronization acquiring process is performed again starting from the selected subchannel according to the channel list, until a system parameter is acquired on a subchannel, which is then taken as the selected subchannel for performing the synchronization maintaining process again; and
   determining whether the BCF is detected before the BCF timer is expired, and if so, resettingthe BCF timer and continuing to detect a physical frame on the selected subchannel; otherwise, the synchronization acquiring process is performed again starting from the selected subchannel according to the channel list, until a system parameter is acquired on a subchannel, which is then taken as the selected subchannel for performing the synchronization maintaining process again; or the synchronization maintaining process further comprises:

starting an SICH timer and a BCF timer when starting to detect a physical frame;

determining whether the SICH is parsed successfully before the SICH timer is expired, and if so, resetting the SICH timer; otherwise, performs the synchronization acquiring process again according to the channel list; and determining whether the BCF is detected before the BCF timer is expired, and if so, resetting the BCF timer and continuing to detect a physical frame on the selected subchannel; otherwise, performing the synchronization acquiring process according to the channel list; or the synchronization maintaining process further comprises:

starting an SICH timer and a BCF timer when starting to detect a physical frame;

determining whether the SICH is parsed successfully before the SICH timer is expired, and if so, resetting the SICH timer; otherwise, reselecting a subchannel from the available subchannels to perform the synchronization maintaining process; and determining whether the BCF is detected before the BCF timer is expired, and if so, resetting the BCF timer and continuing to detect a physical frame on the selected subchannel; otherwise, reselecting a subchannel from the available subchannels to perform the synchronization maintaining process.

2. The method of claim 1, wherein, during the synchronization maintaining process, a starting time of the next physical frame is determined by using the SICH in the current detected physical frame.

3. The method of claim 1, wherein, during the synchronization acquiring process, the physical frame is detected by detecting a frame header of the physical frame; and if no frame header is detected on the current subchannel, the detecting is continued on the current subchannel until waiting time of the subchannel elapses, and then the next subchannel is selected to continue the detecting of a physical frame.

4. The method of claim 1, wherein, during the synchronization acquiring process, if the parsing of the SICH and the CCH fails, the detecting of a physical frame on the current subchannel is continued until waiting time of the subchannel elapses, and then the next subchannel is selected to continue the detecting of a physical frame.

5. The method of claim 1, wherein, during the synchronization acquiring process, acquiring the system parameter comprises:

detecting a broadcast information frame BCF from the physical frame by using a parse result; and acquiring the system parameter from the BCF.

6. The method of claim 5, wherein, when no BCF is detected from the physical frame, the detecting of a physical frame is continued on the current subchannel until a waiting time of the subchannel elapses, and then the next subchannel is selected to continue to detect a physical frame.

7. A wireless network accessing device, comprising a synchronization acquiring module, which comprises:

a first detecting unit, for detecting a physical frame on a current subchannel;

a first parsing unit, for parsing an SICH and a CCH in the physical frame detected by the first detecting unit, wherein the SICH indicates a structure of the physical frame, a location and time length of the CCH in the physical frame is determined by parsing the SICH, and the CCH indicates system resource allocation; and a first acquiring unit, for acquiring a system parameter from the physical frame detected by the first detecting unit by using a parse result of the first parsing unit;

wherein, the first acquiring unit is further adapted to;

after acquiring the system parameter, trigger the first detecting unit to turn to a next subchannel and continue to detect a physical frame, until each subchannel in a predetermined channel list is detected; and take all subchannels, from which the system parameter has been acquired, as available subchannels, and select any one from the available subchannels;

wherein the wireless network accessing device further comprises a synchronization maintaining module, which comprises:

a second detecting unit, for continuing to detect a physical frame on the selected subchannel;

a second parsing unit, for parsing an SICH and a CCH in the physical frame detected by the second detecting unit; and a second acquiring unit, for detecting a BCF from the physical frame detected by the second detecting unit by using the parse result of the second parsing unit, to acquire a system parameter;

wherein, the synchronization maintaining module further comprises: an SICH timer, a BCF timer and a determining unit;

the second detecting unit is further adapted to start the SICH timer and the BCF timer when starting to detect a physical frame;

the determining unit is adapted to determine whether the second parsing unit successfully parses the SICH before the SICH timer is expired, and if so, resetting the SICH timer; otherwise, triggering the synchronization acquiring module to operate again starting from the selected subchannel according to the channel list; and the determining unit is further adapted to determine whether the second acquiring unit detects the BCF before the BCF timer is expired, and if so, resetting the BCF timer and triggering the second detecting unit to continue to detect a physical frame on the selected subchannel; otherwise, triggering the synchronization acquiring module to operate again starting from the selected subchannel according to the channel list; and during the operation performed again, the first acquiring unit is further adapted to, after acquiring the system parameter on a subchannel, directly trigger the synchronization maintaining module to operate again by taking the subchannel as the selected subchannel; or the synchronization maintaining module further comprises: an SICH timer, a BCF timer and a determining unit;

the second detecting unit is further adapted to start the SICH timer and the BCF timer when starting to detect a physical frame; and the determining unit is adapted to determine whether the second parsing unit successfully parses the SICH before the SICH timer is expired, and if so, resetting the SICH timer; otherwise, triggering the synchronization acquiring module to operate again according to the channel list; the determining unit is further adapted to determine whether the second acquiring unit detects the BCF before the BCF timer is expired, and if so, resetting the BCF timer and triggering the second detecting unit to continue to detect a physical frame on the selected subchannel; otherwise, triggering the synchronization acquiring module to operate again according to the channel list; or the synchronization maintaining module further comprises: an SICH timer, a BCF timer and a determining unit;

the second detecting unit is further adapted to start the SICH timer and the BCF timer when starting to detect a physical frame; and the determining unit is adapted to determine whether the second parsing unit successfully parses the SICH before the SICH timer is expired, and if so, resetting the SICH timer; otherwise, triggering the first acquiring unit to reselect one from the available subchannels; and the determining unit is further adapted to determine whether the second acquiring unit detects the BCF before the BCF timer is expired, and if so, resetting the BCF timer and triggering the second detecting unit to continue to detect a physical frame on the selected subchannel; otherwise, triggering the first acquiring unit to reselect one from the available subchannels.

8. The device of claim 7, wherein, the second detecting unit determines a starting time of the next physical frame on the selected subchannel by using the SICH in the current detected physical frame.

9. The device of claim 7, wherein, the first detecting unit detects a physical frame by detecting a frame header of the physical frame;

if no frame header is detected on the current subchannel, the first detecting unit continues to detect on the current subchannel until waiting time of the subchannel elapses, and then turns to the next subchannel and continues to detect a physical frame.

10. The device of claim 7, wherein, if failing to parse the SICH and the CCH, the first parsing unit triggers the first detecting unit to continue to detect a physical frame on the current subchannel until a waiting time of the subchannel elapses, and then triggers the first detecting unit to turn to the next subchannel and continue to detect a physical frame.

11. The device of claim 7, wherein, the first acquiring unit detects a broadcast information frame BCF from the physical frame and then acquires a system parameter from the BCF.

12. The device of claim 11, wherein, when failing to detect the BCF, the first acquiring unit triggers the first detecting unit to continue to detect a physical frame on the current subchannel until a waiting time of the subchannel elapses, and triggers the first detecting unit to turn to the next subchannel and continue to detect a physical frame.

* * * * *